(12) United States Patent
Koch et al.

(10) Patent No.: US 9,660,510 B2
(45) Date of Patent: May 23, 2017

(54) VOLTAGE CONVERTER FOR A MOTOR VEHICLE

(71) Applicant: Robert Bosch GmbH, Stuttgart (DE)

(72) Inventors: Stefan Koch, Kappelrodeck (DE); Jian Tian, Buehl (DE); Ralf-Peter Bergmann, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 116 days.

(21) Appl. No.: 14/363,832

(22) PCT Filed: Nov. 29, 2012

(86) PCT No.: PCT/EP2012/073960
§ 371 (c)(1),
(2) Date: Jun. 9, 2014

(87) PCT Pub. No.: WO2013/083473
PCT Pub. Date: Jun. 13, 2013

(65) Prior Publication Data
US 2014/0369079 A1 Dec. 18, 2014

(30) Foreign Application Priority Data

Dec. 9, 2011 (DE) .................. 10 2011 088 169

(51) Int. Cl.
H02M 1/08 (2006.01)
H02M 3/335 (2006.01)
H02M 3/337 (2006.01)

(52) U.S. Cl.
CPC ............. *H02M 1/08* (2013.01); *H02M 3/337* (2013.01); *H02M 3/33569* (2013.01)

(58) Field of Classification Search
CPC ..... H02M 1/08; H02M 3/337; H02M 3/33569
(Continued)

(56) References Cited

U.S. PATENT DOCUMENTS 5,311,419 A * 5/1994 Shires ................. H02M 1/4216
363/129
2010/0141035 A1* 6/2010 Chen ................. H02M 7/53873
307/64

(Continued)

FOREIGN PATENT DOCUMENTS

DE 3231788 3/1984
DE 102005047055 4/2007
(Continued)

OTHER PUBLICATIONS

International Search Report for Application No. PCT/EP2012/073960 dated Mar. 12, 2013 (English Translation, 3 pages).
(Continued)

*Primary Examiner* — Adolf Berhane
*Assistant Examiner* — Bart Iliya
(74) *Attorney, Agent, or Firm* — Michael Best & Friedrich LLP

(57) ABSTRACT

The invention relates to a voltage converter (1) for a motor vehicle. Said voltage converter (1) comprises a transformer (10) and a power output stage (7). The power output stage (7) comprises at least two semiconductor switches (20, 22, 24, 26) that are connected to the transformer (10), in particular to a primary winding (12) of said transformer (10). The voltage converter (1) has a driver stage (31) which is connected, on the output side, to a control connection of the semiconductor switch (20, 22, 24, 26) and which is designed to actuate said semiconductor switch (20, 22, 24, 26) using a control signal (93, 94), for the purpose of generating an alternating voltage. According to the invention, the driver stage (31) is connected, on the input side, to a pulse signal generator (35) and an input capacitor (60, 62). The pulse signal generator (35) is designed to generate a pulse signal (37, 38) and to actuate the driver stage (31) using the pulse signal (37, 38) in order to generate the control signal (93,

(Continued)

94). For at least one incipient half-wave of the alternating voltage, the pulse signal (37, 38) has at least one prepulse and one main pulse that generates the half-wave, the prepulse being designed to preload the input capacitor (60, 62) of the driver stage (31) such that complete switching of the semiconductor switch (20, 22, 24, 26) can occur more quickly than it could without a prepulse.

9 Claims, 4 Drawing Sheets

(58) Field of Classification Search
USPC .......................................................... 363/17
See application file for complete search history.

(56) References Cited

U.S. PATENT DOCUMENTS

| | | | | |
|---|---|---|---|---|
| 2010/0289532 | A1* | 11/2010 | Wendt ................... | H02M 3/335 327/103 |
| 2011/0133570 | A1* | 6/2011 | Mayo .................... | H03F 3/2176 307/104 |
| 2011/0148494 | A1* | 6/2011 | Voegele ......... | H03K 19/018585 327/178 |
| 2012/0188795 | A1* | 7/2012 | Deng .................. | H02M 3/3376 363/17 |

FOREIGN PATENT DOCUMENTS

| | | |
|---|---|---|
| EP | 0177148 | 4/1986 |
| JP | 11346479 | 12/1999 |
| JP | 2010233447 | 10/2010 |

OTHER PUBLICATIONS

Balogh, "Design and application guide for high speed MOSFET gate drive circuits," Internet Citation, Jan. 1, 2001, pp. 1-37 XP002552367, Retrieved from the Internet on Oct. 26, 2009: URL:http://www.ti.com/lit/ml/slup169/slup169.pdf.

* cited by examiner

VOLTAGE CONVERTER FOR A MOTOR VEHICLE

BACKGROUND OF THE INVENTION

The invention relates to a voltage converter for a motor vehicle. The voltage converter comprises a transformer and a power output stage. The power output stage comprises at least two semiconductor switches that are connected to the transformer, in particular to a primary winding of the transformer. The voltage converter has a driver stage which is connected, on the output side, to a control connection of the semiconductor switch and which is designed to actuate the semiconductor switch using a control signal for the purpose of generating an alternating voltage.

SUMMARY OF THE INVENTION

According to the invention, the driver stage is connected, on the input side, to a pulse signal generator and an input capacitor. The pulse signal generator is designed to generate a pulse signal and to actuate the driver stage using the pulse signal in order to generate the control signal. For at least one incipient half-wave of the alternating voltage, the pulse signal has at least one prepulse and one main pulse that generates the half-wave. The prepulse is preferably designed to preload the input capacitor of the driver stage such that preferably complete switching of the semiconductor switch can occur more quickly than it could without a prepulse.

By generating the prepulse, the input capacitor is advantageously preloaded. As a result, an alternating voltage generated by the power output stage, on the output side, can advantageously have a steep edge at the outset of the alternating voltage.

In an advantageous embodiment, two semiconductor switches that form a semiconductor switch pair, in particular switching paths of the semiconductor switches, are connected in series to the primary winding of the transformer.

The driver stage is preferably designed to switch on a semiconductor switch of the semiconductor switch pair that is connected in series to the transformer, in particular to the primary winding of the transformer, by means of the prepulse, wherein the driver stage is designed to block the further semiconductor switch of the semiconductor switch pair during the prepulse. As a result, the input capacitor can be advantageously preloaded by means of the prepulse, whereas the input capacitor is discharged via the semiconductor switches as well as via the primary winding of the transformer during a conducting state of the semiconductor switches of the semiconductor switch pair—controlled by the driver stage. A voltage converter for generating a voltage pulse or a series of voltage pulses can be formed by means of the circuit arrangement formed in the aforementioned manner and comprising a power output stage that includes a semiconductor switch pair. The semiconductor switch pair is preferably formed by a high-side semiconductor switch and a low-side semiconductor switch.

The driver stage is preferably designed to jointly switch on the semiconductor switches of the semiconductor switch pair after generating the main pulse. In so doing, the electrical energy which is represented by the prepulse and the main pulse and is temporarily stored in the input capacitor can be discharged across the primary winding of the transformer for the purpose of generating the alternating voltage, in particular a half-wave of the alternating voltage.

In a preferred embodiment, the voltage converter comprises two semiconductor switch half-bridges. The semiconductor switch half-bridges comprise respectively a high-side semiconductor switch and a low-side semiconductor switch. The semiconductor switch half-bridges are connected in each case, on the output side, to mutually different connections of the primary winding of the transformer. By means of the two semiconductor switch half-bridges, an H-bridge, also referred to as full bridge, is thus formed in which the outputs of the half-bridges are connected to each other via an output load, in particular the primary winding.

In the case of a field effect transistor being used as the semiconductor switch, an output of a half-bridge is formed by means of a connection node between a source terminal of the high-side FET and a low-side FET.

The pulse signal generator is preferably designed to actuate the driver stage such that a current flow is blocked through the transformer when the prepulse for a semiconductor switch is generated. When two mutually complementary semiconductor switches of the power output stage, for example a high-side semiconductor switch of the first half-bridge and a low-side semiconductor switch of the second half-bridge, are subsequently switched on, the primary coil of the transformer can thus at least partially discharge the electrical energy stored in the input capacitor via the complementary semiconductor switches which have been switched-on in this manner across the primary winding of the transformer.

The pulse signal generator is preferably designed to generate prepulses for the two transistor half-bridges, the prepulses being temporally spaced apart from each other such that the transformer cannot be energized by said prepulses. The pulse signal generator is preferably designed to apply respectively a prepulse to the transistors of the two half-bridges in a temporally successive manner. It is furthermore preferred for only one transistor of the two half-bridges to be switched on during a prepulse. As a result, the electrical energy represented by the prepulses can be stored in the input capacitor.

In a preferred embodiment, the pulse signal generator is designed to simultaneously apply a prepulse to the high-side semiconductor switch and the low-side semiconductor switch of a half-bridge. In a further preferred manner, the driver stage is designed to block the semiconductor switch of the further half-bridge while the semiconductor switch of the first half-bridge is being switched on. In so doing, the electrical energy represented by the prepulses cannot be discharged across the primary winding.

The driver stage is preferably designed to generate the electrical charge for switching the power output stage at least partially from the prepulse and in to temporarily store said charge in the input capacitor in order to meet this end. The driver stage is, for example, galvanically connected to the power output stage. The power output stage and/or the driver stage is preferably galvanically separated from the pulse signal generator—preferably by means of an isolating transformer.

By means of the embodiment of the driver stage designed in the aforementioned manner, said driver stage can be advantageously implemented at low costs. The energy of the pre- and main pulses generated by the pulse signal generator can very advantageously serve to generate the alternating voltage.

The voltage converter preferably comprises only one voltage source for generating the alternating voltage. The voltage source is preferably formed by the pulse signal generator.

The invention also relates to a method for the pulsed actuation of a voltage converter. The voltage converter comprises a driver stage with an input capacitor, a power output stage connected, on the output side, to the driver stage and a transformer connected, on the output side, to the power output stage.

In the method, a prepulse is preferably generated and the input capacitor of the driver stage is preloaded with the prepulse. A main pulse is further generated temporally subsequent to the prepulse, wherein the input capacitance for switching the power output stage—in particular by providing current to a control connection of a semiconductor switch of the power output stage by means of the main pulse—is at least partially discharged. The input capacitance preferably comprises at least one capacitor.

In the method, a prepulse is preferably applied in each case to the semiconductor switches, in particular to transistors of the power output stage, in a temporally successive manner.

The power output stage of the voltage converter preferably comprises two semiconductor switch half-bridges which in each case comprise a high-side semiconductor switch and a low-side semiconductor switch, the semiconductor switch half-bridges being connected in each case, on the output side, to a connection of a primary winding of the transformer. According to the method, a prepulse is applied simultaneously to the semiconductor switches of a semiconductor switch half-bridge.

The semiconductor switch is preferably formed by a thyristor and a transistor, in particular a field effect transistor or an IGBT (IGBT=insulated gate bipolar transistor).

BRIEF DESCRIPTION OF THE DRAWINGS

The invention will now be described below with the aid of the figures and further exemplary embodiments.

DETAILED DESCRIPTION

Figure 1:
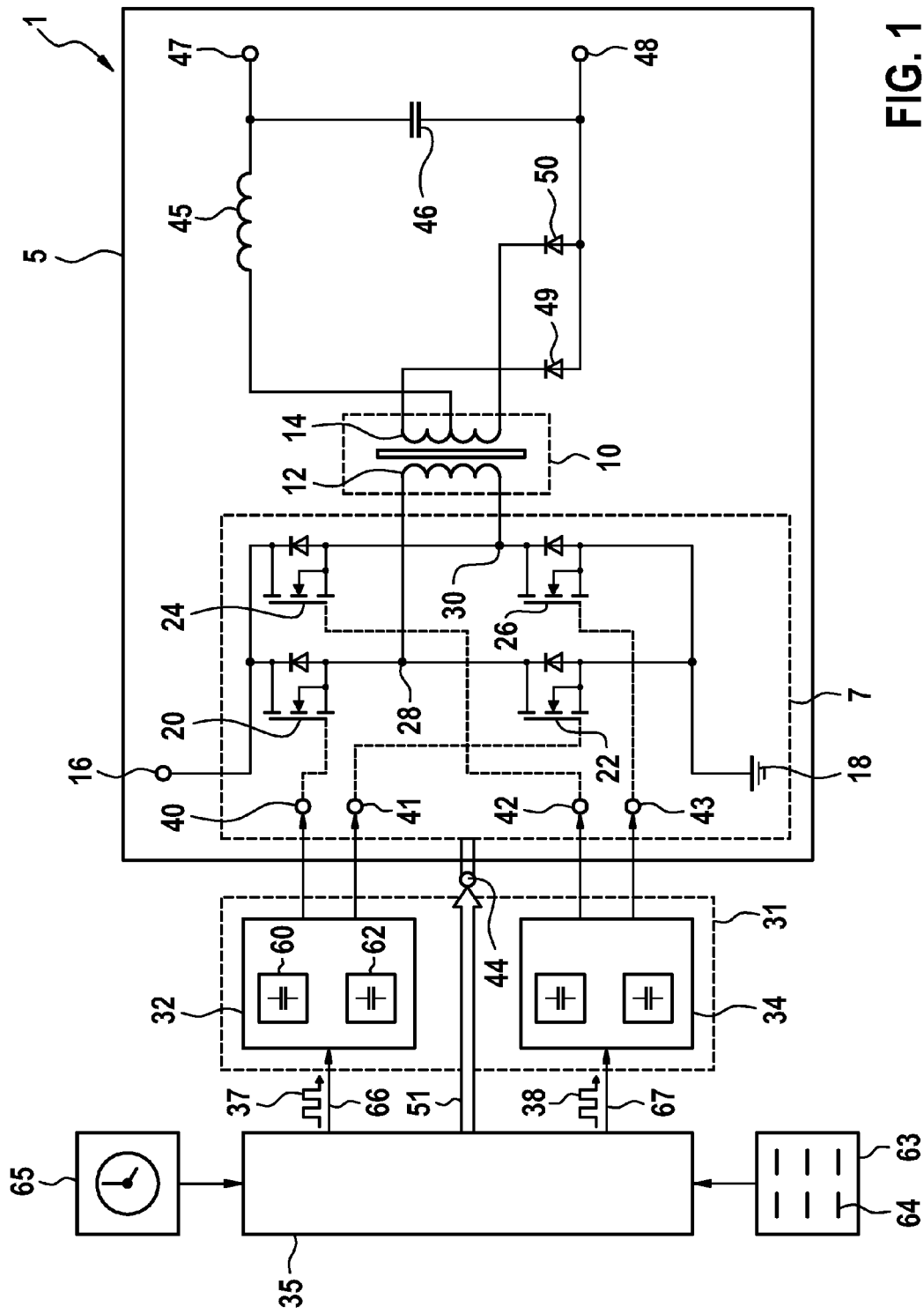
FIG. 1 shows an exemplary embodiment for a voltage converter comprising a power output stage and a driver stage for the power output stage, wherein drivers of the driver stage are designed in each case to draw an electrical energy for switching control connections of semiconductor switches of the power output stage from a series of pulse signals.

FIG. 1 shows an exemplary embodiment for a voltage converter 1. The voltage converter 1 comprises an inverter 5. The inverter 5 has a power output stage 7 comprising an H-bridge that includes two transistor half-bridges. The inverter 5 also comprises a transformer 10. The transformer 10 comprises a primary coil 12 and a secondary coil 14. The first half-bridge of the power output stage 7, comprising a high-side transistor 20 and a low-side transistor 22, is connected by means of an output, represented by the connection node 28, to a first terminal of the primary coil 12 of the transformer 10. The second half-bridge of the power output stage 7, comprising a high-side transistor 24 and a low-side transistor 26, is connected, on the output side, via a connection node 30 to the second terminal of the primary coil 12 of the transformer 10.

The high-side transistor 20 and the low-side transistor 26 thus form a semiconductor switch pair which is formed from mutually complementary transistors of two mutually different transistor half-bridges of the H-bridge.

The transformer 10, in particular the secondary coil 14 of the transformer 10, has a center tap which is connected via a choke coil 45 to an output 47 of the inverter 5. Besides the center tap, the secondary coil 14 has a first and a second terminal of the secondary coil 14, the first terminal being connected via a rectifier diode 49 to a further output-side terminal 48 of the inverter 5. The further terminal 48 represents a ground connection or a minus pole of the voltage converter 1 at the output terminal. The output 47 represents a plus pole of the voltage converter 1 at the output terminal. The second terminal of the secondary coil 14 is connected via a rectifier diode 50 to the output terminal 48. The output terminal 47 is connected via a capacitor 46 to the output terminal 48. The capacitor 46 represents jointly with the choke coil 45 a low pass filter.

The low-side transistors 22 and 26 are connected in each case by means of a source terminal to a ground connection 18. The drain terminals of the high-side transistors 20 and 24 are in each case connected to a terminal 16 for a supply voltage. The source terminal of the high-side transistor 20 is connected via the connection node 28 to the drain terminal of the low-side transistor 22. The source terminal of the transistor 24 is connected via the connection node 30 to the drain terminal of the low-side transistor 26. The transistors 20, 22, 24 and 26 are in each case embodied as MOSFET transistors (MOSFET=metal-oxide-semiconductor field effect transistor).

In this exemplary embodiment, the power output stage 7 has four control inputs 40, 41, 42 and 43 which in each case are connected to a gate terminal of a transistor of the power output stage 7. The control input 40 is connected to the gate terminal of the transistor 20, the control input 41 to the gate terminal of the low-side transistor 22, the control input 42 to the gate terminal of the high-side transistor 24 and the control input 43 is connected to the gate terminal of the low-side transistor 26. The control inputs 40 and 41 are connected in each case to a driver 32 of a driver stage 31. The driver stage 31 has in addition to the driver 32 also a driver 34 which, on the output side, is connected to the control inputs 42 and 43. The drivers 32 and 34 are in each case designed to receive a pulse signal on the input side and to generate and output, on the output side, a control signal as a function of the pulse signal for the purpose of actuating, in particular of switching on or blocking, a gate terminal. The driver 34 is connected, on the output side, via a connection line to the control input 42 of the power output stage 7 and by means of a further connection line to the control input 43 of the power output stage 7. The driver is designed to generate a control signal as a function of a pulse signal received on the input side, for example as a function of the pulse signal 38 depicted in FIG. 1, and output the same, on the output side, for the purpose of actuating a gate terminal of the transistor 24 and/or 26.

The voltage converter 1 also comprises a pulse signal generator 35. The pulse signal generator 35 is connected, on the input side, to a timer 65 and to a store 63. Data sets are kept on hand in the store 63, which sets in each case represent an actuation pattern for actuating the power output stage 7. The data set 64 is referenced by way of example.

The pulse signal generator 35 is connected, on the output side, via a connection line 66 to the driver 32 and via a connection line 67 to the driver 34. The pulse signal generator 35 is also connected, on the output side, via a connection 51, for example a multi-channel connection, to a control input of the power output stage 7. The control input 44 of the power output stage 7 is, for example, formed by an inhibit input.

The pulse signal generator 35 is designed to block at least one of the transistors 20, 22, 24 and 26 by actuating the power output stage via the control input 44.

Depending upon the intended pulse signal pattern, the corresponding transistor of a transistor half-bridge is blocked via the control input 44 in order to prevent a current flow through the primary coil 12 of the transformer 10 if a transistor of a further half-bridge is switched on.

Thus—as is explained in greater detail below with the aid of FIGS. 2, 3 and 4—an input capacitance of the drivers 32 and 34, in particular represented by a capacitor, can be preloaded prior to a main pulse being sent to energize the primary coil 12 of the transformer 10.

The capacitors 60 and 62 of the driver 32 are denoted by way of example. The pulse signal 37 which has been generated by the pulse signal generator 35 comprises for that reason prepulses for loading the capacitors 60 and 62. In order to load the capacitor 60, the pulse signal 37 has, for example, a prepulse for switching on the transistor 20.

In order to load the capacitor 62, the pulse signal 37 has a prepulse for switching on the transistor 22. The transistors 20 and 22 of a transistor half-bridge of the power output stage 7 can thus in each case be switched on by the pulse signal 37. While the transistors 20 and 22 are being switched on, the transistors 24 and 26 are in each case blocked by an inhibit signal which is generated by the pulse signal generator 35 and is received via the connection 51 and the control input 44. Hence, no current can flow through the primary coil 12. That has the effect that the electrical load stored in the capacitors 60 and 62, which, in the event of the primary coil 12 being energized, would be consumed for the low-impedance connection of the switching path of the transistors 20 or 22, can be accumulated in said capacitors 60 or 62.

The timer 65 has, for example, an oscillating crystal and is designed to generate and output a time signal that represents a clock pulse.

Figure 2:
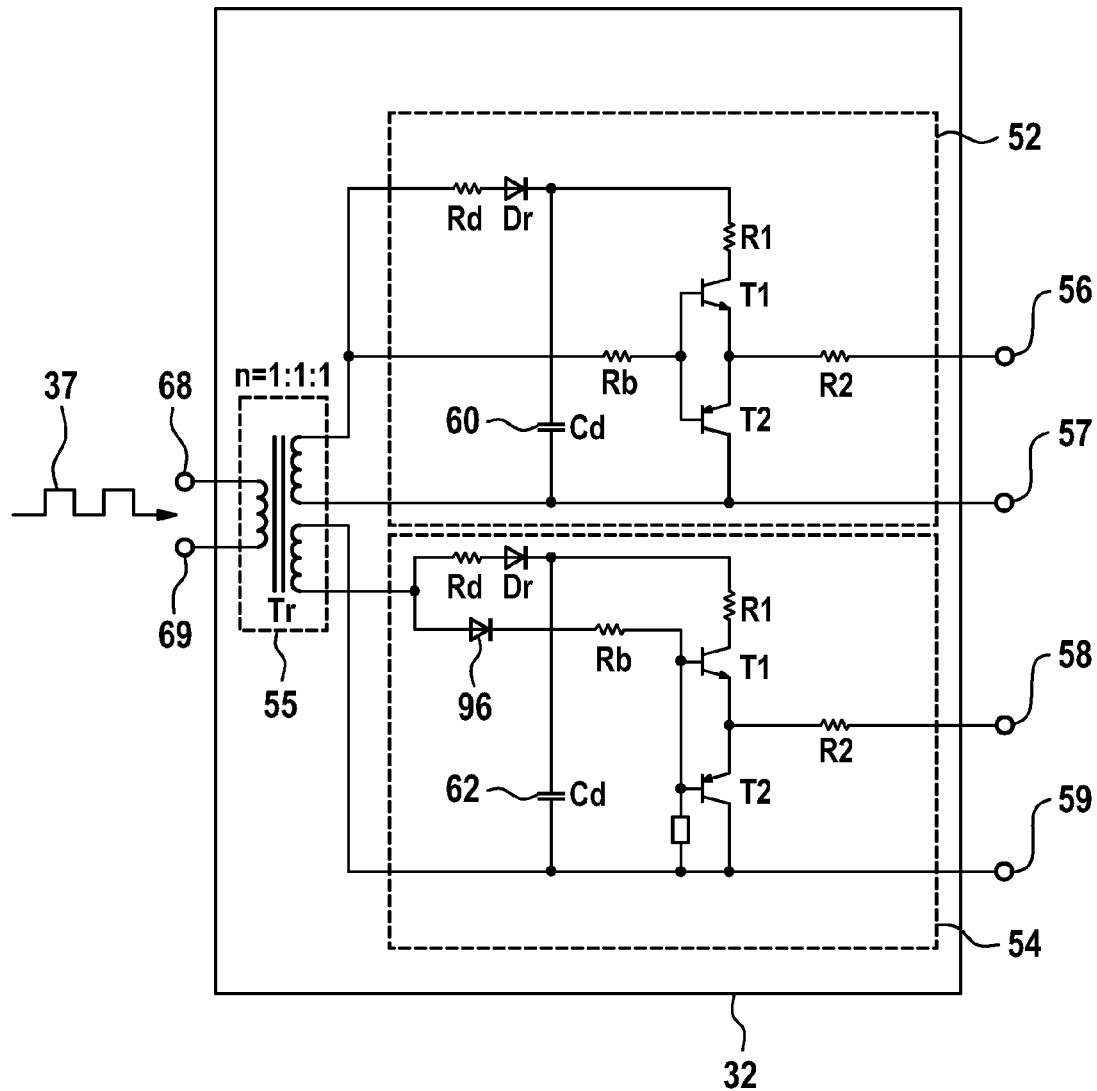
FIG. 2 shows an exemplary embodiment for a driver of the driver stage depicted in FIG. 1.

FIG. 2 shows an exemplary embodiment for the driver 32 of the driver stage 31, which driver was already depicted in FIG. 1. The driver 32 comprises an input transformer, the inputs 68, 69 of which are connected to a primary coil of the input transformer 55. The pulse signal 37 is also depicted which can be received at the inputs 68 and 69.

The input transformer 55 comprises two secondary coils, a first secondary coil being connected to a driver 52 for a high-side transistor, in particular the high-side transistor 20 already depicted in FIG. 1, and a second secondary coil being connected to a driver 54 for a low-side transistor, in particular the low-side transistor 22 already depicted in FIG. 1. The driver 52 comprises the capacitor 60 already mentioned with regard to FIG. 1. The driver also comprises the capacitor 62 already mentioned with regard to FIG. 1. The capacitor 60 is connected via a rectifier diode in parallel with the first secondary coil. The capacitor 62 is connected in parallel with a series circuit comprising the second secondary coil and at least one rectifier diode. The drivers 52 and 54 comprise in each case a complementary output stage, the complementary output stage of the driver 52 being connected, on the output side, to the output terminal 56 for the gate terminal of the transistor 20 depicted in FIG. 1. The complementary output stage comprises in each case a PNP and a NPN transistor the emitter-collector paths of which are connected in series with each other.

The complementary output stage of the driver 54 for the low-side comprises, on the input side, a protective diode which can prevent a rising base-emitter current of the complementary output stage.

In FIG. 1, the output terminal 56 is connected to the control input 40. The driver 52 also has an output terminal 57 for connecting to a source terminal of a transistor, in this exemplary embodiment to the source terminal of the high-side transistor 20. The output terminal 57 is connected to the ground connection of the driver 52 and thus forms a reference potential with respect to the output terminal 56. The driver 54 comprises an output terminal 58 for a gate terminal of the low-side transistor 22 and an output terminal 59 for connecting to a source terminal of the low-side transistor 22.

The driver 52 and the driver 54 are in each case designed to generate mutually mirrored output signals as a function of a periodic input signal. That is depicted below in FIG. 3 in the time segment 79.

Figure 3:
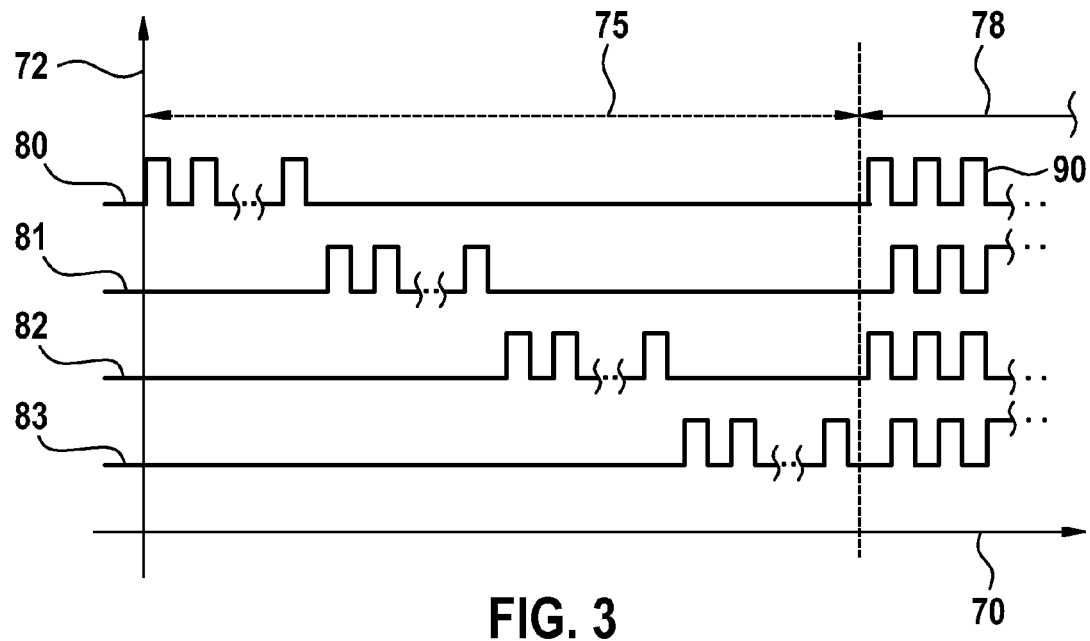
FIG. 3 shows an exemplary embodiment for a pulse signal pattern for actuating the driver stage depicted in FIG. 1.

FIG. 3 shows a diagram, in which control signals are depicted which have been generated in each case as a function of at least one pulse signal generated by the pulse signal generator 35 depicted in FIG. 1. The power output stage 7 depicted in FIG. 1, in particular the switching transistors of the power output stage 7, can be actuated for switching by means of the control signals depicted in FIG. 3. A control signal 80 for actuating the high-side transistor 20 of the power output stage 7, a control signal 81 for controlling the low-side transistor 22 of the power output stage 7, a control signal 82 for actuating the low-side transistor 26 of the power output stage 7 and a control signal 83 for actuating the high-side transistor 24 of the power output stage 7 are depicted. In this exemplary embodiment, the control signal 80 has a plurality of prepulses, wherein the pulse signal generator 35 in FIG. 1 is designed to generate a number of prepulses such that the capacitor 60 of the driver 32 can be charged to a predetermined voltage, for example at least 10 volts. During a time interval 75, the capacitor 60 for switching the high-side transistor 20 is then preloaded. Furthermore, the capacitor 62 for the low-side transistor 22 is preloaded by means of prepulses, which is depicted in time interval 75 by means of the prepulses of the pulse signal 81.

The capacitor for the low-side transistor 26 can be preloaded by means of further prepulses of the pulse signal; and the capacitor for the high-side transistor 24 can be preloaded by means of further prepulses of the pulse signal 83. During a time interval 78 following the time interval 75, which interval 78 is depicted in FIG. 3 with a temporal initial segment, the power output stage 7 for energizing the primary coil 12 of the transformer 10 can then be switched on by means of pulses, from which the pulse 90 is indicated by way of example.

The diagram shown in FIG. 3 has an axis 70 which represents a time axis and an axis 72 which represents an amplitude axis.

Figure 4:
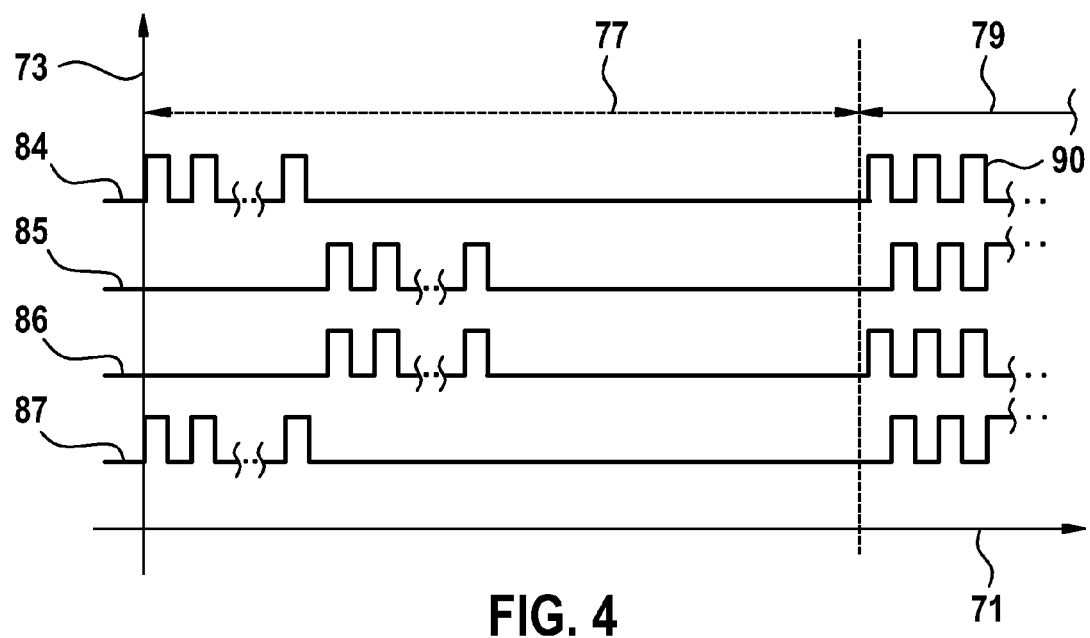
FIG. 4 shows an exemplary embodiment for a pulse signal pattern for actuating the driver stage depicted in FIG. 1.

FIG. 4 shows a diagram comprising a time axis 71 and an amplitude axis 73. During a time interval 77, the high-side transistor 20 is actuated by means of the pulse signal 84. At the same time, the high-side transistor 24 is actuated by means of the pulse signal 87. The low-side transistors 22 and 26 are blocked during the actuation of the high-side transistors 20 and 24—for example by generating an inhibit signal by the pulse signal generator 35 and applying the inhibit signal to the control input 44. In so doing, the primary coil 12 of the transformer 10 in FIG. 1 cannot be energized during the time interval 77. The energy stored in the capacitors of the driver 32 or 34 by means of the pulses 84 and 87 is therefore not consumed during the time interval 77, in which the prepulses are generated. The capacitor 60 can thus, for example in time interval 77, build up a voltage of at least 10 volts.

After switching on the high-side transistors 20 and 24 by means of the temporally synchronous pulses 84 and 87, the low-side transistors 22 and 26 can then be switched on by means of the pulses 85 or 86—in this exemplary embodiment likewise mutually synchronous. The time interval 77 can therefore be designed shorter than the time interval 75. The capacitors of the driver stages 32 and 34 can be preloaded faster using the method depicted in FIG. 4 than with the method depicted in FIG. 3.

A time interval 79 follows the time interval 77, which time interval 79 is depicted by a temporal initial segment. Main pulses, by means of which the primary coil 12 of the transformer 10 can be energized, are generated by the pulse signal generator 35 during the time interval 79. During the time interval 79, an initial alternating voltage of the voltage converter 1 can thus be generated by means of the secondary coil 14 depicted in FIG. 1. Said initial alternating voltage, which is rectified by means of the diodes 49 and 50, can be provided as DC voltage at the output terminals 47 and 48 of the voltage converter 1.

Figure 5:
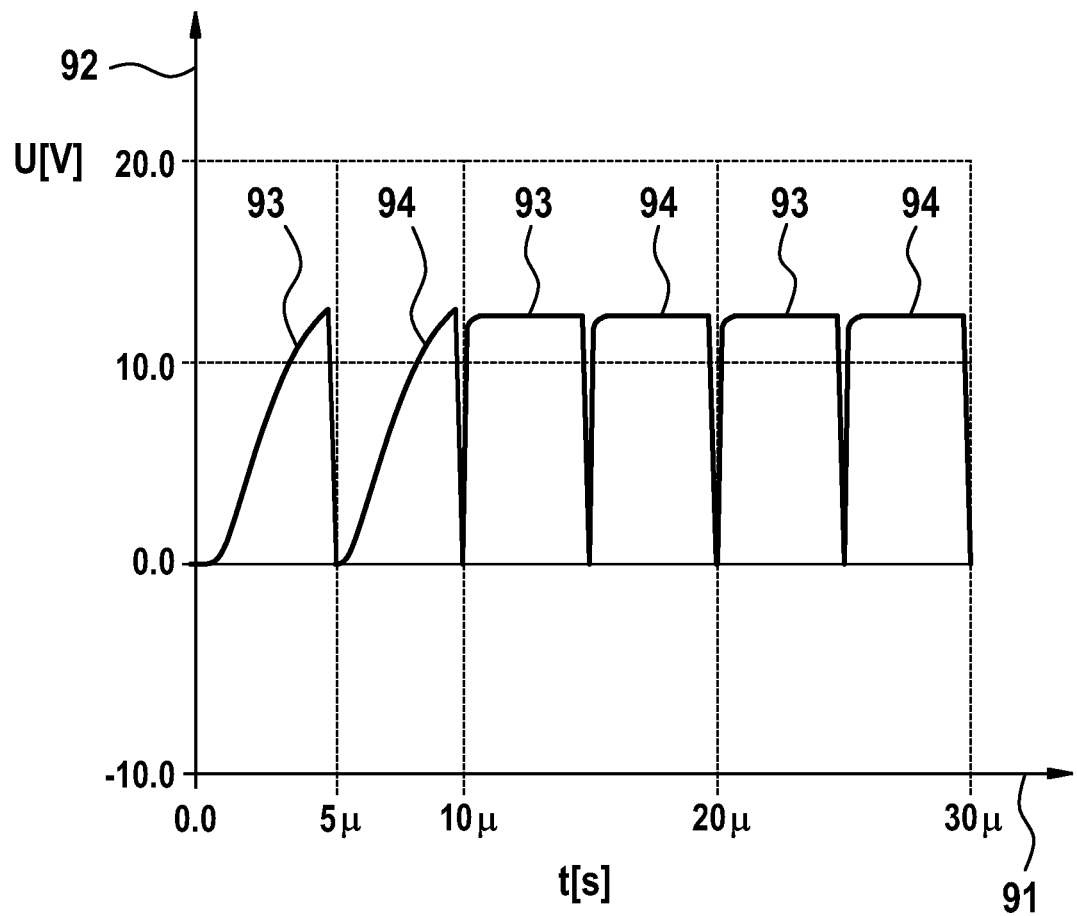
FIG. 5 shows an exemplary embodiment for a control signal of the driver stage depicted in FIG. 1, which has been generated without the pulse signal patterns shown in FIGS. 3 and 4 and which can be improved by the pulse signal patterns depicted in FIGS. 3 and 4.

FIG. 5 shows a diagram in which control signals generated by the driver stage 31 for actuating the half-bridges of the power output stage 7 are depicted. A control signal 93 for a first half-bridge of the power output stage 7 is depicted, said output stage comprising the high-side transistor 20 and the low-side transistor 22. A control signal 94 for actuating the second half-bridge of the power output stage 7 is also depicted, said output stage comprising the high-side transistor 24 and the low-side transistor 26.

It can be seen that the control signals 92 and 94 have in each case a rising edge during the first five microseconds. The rising edge is a result of the capacitors of the driver stage 31 not being fully loaded, wherein the power output stage 7 is already actuated to energize the primary coil 12 of the transformer 10.

The rising edge of the signals 93 and 94 can be prevented using the method described in FIGS. 3 and 4. If the capacitors of the driver stage 31 depicted in FIG. 1 are preloaded during the time interval 75 depicted in FIG. 3 or during the time interval 77 depicted in FIG. 4, the power output stage 7 can be actuated using a rectangular control signal already from the beginning of a generation of an alternating voltage by means of the power output stage 7.

The invention claimed is:

1. A voltage converter (1) for a motor vehicle, comprising:
a transformer (10);
a driver stage (31);
and a power output stage (7) including two semiconductor switch half-bridges which respectively comprise a high-side semiconductor switch (20, 24) and a low-side semiconductor switch (22, 24),
wherein the power output stage (7) includes at least two semiconductor switches (20, 22, 24, 26) connected to the transformer (10); and outputs of the driver stage (31) are connected to a control connection of the semiconductor switch (20, 22, 24, 26), the driver stage (31) configured to actuate said semiconductor switch (20, 22, 24, 26) using a control signal (93, 94) for the purpose of generating an alternating voltage,
wherein inputs of the driver stage (31) are connected to a pulse signal generator (35) and the driver stage (31) includes an input capacitor (60, 62), the pulse signal generator (35) configured to generate a pulse signal (35, 37, 80, 81, 82, 83, 90) to actuate the driver stage (31) in order to generate the control signal (93, 94),
wherein, for at least one incipient half-wave, the pulse signal (35, 37, 80, 81, 82, 83, 90) has at least one prepulse and one main pulse that generates the half-wave, the prepulse preloading the input capacitor of the driver stage such that a switching of the semiconductor switch occurs more quickly than possible without the prepulse;
wherein outputs of the half-bridges are connected in each case to mutually different terminals of a primary winding (12) of the transformer (10) and the pulse signal generator (35) is configured to actuate the driver stage (31) such that a current flow through the transformer (10) is blocked when the prepulse (80, 81, 82, 83) for the semiconductor switch (20, 22, 24, 26) is being generated; and the pulse signal generator is configured to apply the prepulse (80, 81, 82, 83) to each transistor of the two half-bridges in a temporally successive manner.

2. The Voltage converter (1) according to claim 1, characterized in that the driver stage (31) is configured to switch on the semiconductor switch (20) of a semiconductor switch pair (20, 26) that is connected in series with the transformer (10) using the prepulse (80, 81, 82, 83), wherein a further semiconductor switch (26) of the semiconductor switch pair (20, 26) is blocked during the prepulse (80, 81, 82, 83).

3. The voltage converter (1) according to claim 2, characterized in that the pulse signal generator (35) is configured to simultaneously apply a prepulse (84, 85, 86, 87) to the high-side semiconductor switch (20, 24) and to the low-side semiconductor switch (22, 26) of the one half-bridge.

4. The voltage converter (1) according to claim 1, characterized in that the pulse signal generator (35) is designed to generate prepulses (80, 81, 82, 83) for the two transistor half-bridges in such a manner that the prepulses are temporally spaced apart from each other so that the transformer cannot be energized by said prepulses.

5. The voltage converter (1) according to claim 1, characterized in that the driver stage (31) is configured to generate the electrical charge for switching the power output stage at least partially from the prepulse (80, 81, 82, 83, 84, 85, 86, 87) and to temporarily store said charge in the input capacitor (60, 62) in order to meet this end.

6. The voltage converter (1) according to claim 1, wherein the at least two semiconductor switches (20, 22, 24, 26) are connected to a primary winding (12) of the transformer (10).

7. A method for the pulsed actuation of a voltage converter (1), said voltage converter (1) comprising a driver stage (31) which includes an input capacitor (60, 62) and a power output stage (7) inputs of which are connected to the driver stage (31) a transformer (10) inputs of which is connected to the power output stage (7), and two semiconductor switch half-bridges which respectively comprise a high-side semiconductor switch (20, 24) and a low-side semiconductor switch (22, 24), wherein the half-bridges are connected in each case to mutually different terminals of a primary winding (12) of a transformer (10) wherein, according to said method, a prepulse (80, 81, 82, 83, 84, 85, 86, 87) is generated in a time interval (75, 77) and the input capacitor of the driver stage is preloaded with the prepulse (80, 81, 82, 83, 84, 85, 86, 87), and a main pulse (90) is generated temporally subsequent to the prepulse (80, 81, 82,

83, 84, 85, 86, 87), wherein the input capacitor is at least partially discharged for the purpose of switching the power output stage, and a current flow through the transformer (10) is blocked when the prepulse (80, 81, 82, 83) for one of the semiconductor switches (20, 22, 24, 26) is being generated.

8. The method according to claim 7, wherein the prepulse (75) is applied respectively to semiconductor switches (20, 22, 24, 26) of the power output stage (7) in a temporally successive manner.

9. The method according to claim 7, in which the semiconductor switch half-bridges are connected in each case, on an output side, to mutually different terminals (28, 30) of a primary winding (12) of the transformer (10), and in which the prepulse (77) is applied simultaneously to the semiconductor switches of the semiconductor switch half-bridge.

* * * * *